(12) United States Patent
Kundu et al.

(10) Patent No.: US 9,024,011 B2
(45) Date of Patent: May 5, 2015

(54) PROCESSES FOR CROSS-LINKING CELLULOSE ETHERS UNDER MILD CONDITIONS

(75) Inventors: Patit Paban Kundu, Kolkata (IN); Ratan Pal Singh, Patiala (IN)

(73) Assignee: University of Calcutta, Kolkata (IN)

(*) Notice: Subject to any disclaimer, the term of this patent is extended or adjusted under 35 U.S.C. 154(b) by 527 days.

(21) Appl. No.: 13/377,493

(22) PCT Filed: Sep. 2, 2010

(86) PCT No.: PCT/IB2010/002171
§ 371 (c)(1),
(2), (4) Date: Dec. 9, 2011

(87) PCT Pub. No.: WO2011/151670
PCT Pub. Date: Dec. 8, 2011

(65) Prior Publication Data
US 2012/0095202 A1    Apr. 19, 2012

(30) Foreign Application Priority Data
Jun. 2, 2010   (IN) .............................. 601/KOL/2010

(51) Int. Cl.
| C08B 11/08 | (2006.01) |
| C08B 11/20 | (2006.01) |
| C07H 1/00 | (2006.01) |
| C08J 3/24 | (2006.01) |
| B01D 67/00 | (2006.01) |
| B01D 71/22 | (2006.01) |
| C08G 18/64 | (2006.01) |
| C08J 5/18 | (2006.01) |

(52) U.S. Cl.
CPC ............. *C08J 3/245* (2013.01); *B01D 67/0093* (2013.01); *B01D 71/22* (2013.01); *B01D 2323/30* (2013.01); *C08G 18/6484* (2013.01); *C08J 5/18* (2013.01); *C08J 2301/26* (2013.01); *C08J 2301/28* (2013.01)

(58) Field of Classification Search
CPC ........... C08B 11/20; C08B 11/08; C07H 1/00
USPC ........... 536/85, 88, 90, 91, 95, 96, 97, 98, 99, 536/100, 124
See application file for complete search history.

(56) References Cited

U.S. PATENT DOCUMENTS

| 3,936,441 A | 2/1976 | Holst et al. |
| 4,005,012 A | 1/1977 | Wrasidlo |
| 5,008,359 A | 4/1991 | Hunter |
| 5,068,269 A | 11/1991 | Diamantoglou |
| 5,140,086 A | 8/1992 | Hunter et al. |
| 7,608,167 B2 | 10/2009 | Luo et al. |
| 2005/0048207 A1 | 3/2005 | Gutowski et al. |
| 2009/0318620 A1 | 12/2009 | Liu et al. |
| 2010/0059440 A1 | 3/2010 | Rudstedt et al. |
| 2010/0178517 A1 | 7/2010 | Pouchelon et al. |

FOREIGN PATENT DOCUMENTS

| CN | 1091144 A | 8/1994 |
| CN | 1354697 A | 6/2002 |
| CN | 1468649 A | 1/2004 |
| CN | 101605591 A | 12/2009 |
| EP | 0 265 088 | 4/1988 |
| GB | 1 585 074 | 2/1981 |
| GB | 2 112 791 | 7/1983 |
| JP | 2002363306 A | * 12/2002 |
| WO | WO-2008/095709 | 8/2008 |

OTHER PUBLICATIONS

SU 630258 A, Nov. 1978, Country SU, Inventor—Petropavlo G A et al.*

Bajpai, A.K. et al., "Water sorption behaviour of highly swelling (carboxy methylcellulose-g-polyacrylamide) hydrogels and release of potassium nitrate as agrochemical," Carbohydrate Polymers, 2003, vol. 53, pp. 271-279.

Bochek, A.M. et al., "Formation of Physical Thermally Reversible Gels in Solutions of Methyl Cellulose in Water and Dimethylacetamide and Properties of Films Thereof," Russian Journal of Applied Chemistry, 2001, vol. 74, No. 8, pp. 1358-1363.

Chen, L. et al., "Controlled release of urea encapsulated by starch-g-poly(L-lactide)," Carbohydrate Polymers, 2008, vol. 72, pp. 342-348.

Colom, X. et al., "Effects of different treatments on the interface of HDPE/lignocellulosic fiber composites," Composites Science and Technology, 2003, vol. 63, pp. 161-169.

International Search Report and Written Opinion for PCT/IB2010/002171 mailed Dec. 14, 2010.

Lorand, E.J. et al., "Preparation of Cellulose Ethers—Function of Alkali; Side Reactions," Ind. Eng. Chem., Jul. 1939, vol. 31, No. 7, pp. 891-897.

Schumann, K. et al., "Novel Cellulose Ethers: Synthesis and Structure Characterization of 3-Mono-O-(3'-hydroxypropyl) Cellulose," Macromolecular Symposia, 2009, vol. 280, pp. 86-94.

Yamashina, H. et al., "Strengthening Paper-Pipe Cores with Aromatic Isocyanate Compounds," J. Hokkaido For. Prod. Res. Inst., 1988, vol. 2, No. 3, pp. 28-32 (with English abstract).

(Continued)

*Primary Examiner* — Patrick Lewis
*Assistant Examiner* — Everett White
(74) *Attorney, Agent, or Firm* — Foley & Lardner LLP

(57) ABSTRACT

The present technology provides processes for cross-linking cellulose ethers under mild conditions. The processes include exposing a substantially dry cellulose ether film to a polyisocyanate to provide a cross-linked cellulose ether film, wherein the substantially dry cellulose ether film comprises alkoxide groups on the cellulose. The resulting cellulose ether films are highly cross-linked by polyurethane linkages and may be used as membranes in a variety of applications.

12 Claims, 3 Drawing Sheets

(56) References Cited

OTHER PUBLICATIONS

Zhu, et al., "Nanoclay reinforced bio-based elastomers: Synthesis and Characterization," Polymer, 2006, vol. 47, pp. 8106-8115.

"PAPI 2940 Product Information," The Dow Chemical Company, 2001, pp. 1-4, accessed at http://msdssearch.dow.com/PublishedLiteratureDOWCOM/dh_003f/0901b8038003f167.pdf?filepath=polyurethane/pdfs/noreg/026-00012.pdf&fromPage=GetDoc.

Supplementary European Search Report for European Application No. EP10852465 mailed on Dec. 16, 2013. (7 pages).

* cited by examiner

PROCESSES FOR CROSS-LINKING CELLULOSE ETHERS UNDER MILD CONDITIONS

CROSS-REFERENCE TO RELATED APPLICATIONS

The present application is a U.S. national stage filing under 35 U.S.C. §371 of International Application No. PCT/IB2010/002171, filed on Sep. 2, 2010, which claims priority to and the benefit of Indian Application No. 601/KOL/2010, filed Jun. 2, 2010, both of which are incorporated herein by reference in their entirety.

BACKGROUND

Cellulose ethers have widespread applications as membranes in, e.g., dialysis, reverse osmosis and ultrafiltration. More recently, membranes and hydrogels comprising cellulose have been investigated for use in the controlled release of fertilizers and pesticides in agriculture. To provide improved service life and higher strength, cellulose ether membranes are often cross-linked. Current processes for cross-linking cellulose ethers typically require potentially toxic catalysts such as organotin or organozinc compounds, high heat, and/or high pressure.

SUMMARY

The present technology provides processes for cross-linking cellulose films under mild conditions as well as the films produced by such processes. Thin films prepared in accordance with the processes may be up to 100% cross-linked and stable in cold water for days or even weeks. In one aspect the processes of the present technology include exposing a substantially dry cellulose ether film to a polyisocyanate to provide a cross-linked cellulose ether film, wherein the substantially dry cellulose film includes alkoxide groups on the cellulose. Such processes may be carried out at ambient temperature.

In some embodiments of the present processes, the cellulose ether is selected from the group consisting of methyl cellulose, ethyl cellulose, 2-hydroxyethyl cellulose, 2-hydroxypropyl cellulose, 3-hydroxybutyl cellulose, carboxymethyl cellulose, carboxymethyl 2-hydroxyethyl cellulose, 2-hydroxyethyl methyl cellulose, 2-hydroxybutyl methyl cellulose, and 2-hydroxyethyl ethyl cellulose. In some embodiments, the substantially dry cellulose ether film comprises no more than about 0.1% water by weight.

In other embodiments of the present processes, the alkoxide groups on the cellulose are alkali metal alkoxide groups. Illustrative embodiments of alkali metals that may be used include but are not limited to lithium, sodium, potassium, and cesium.

Various polyisocyanates may be used in the present processes such as, for example, alkyl diisocyanates, aryl diisocyanates, or poly(diphenylmethane diisocyanate)s. Illustrative embodiments of polyisocyanates include but are not limited to 1,6-hexamethylene diisocyanate, toluene diisocyanate, and diphenylmethane diisocyanate. In some embodiments, the substantially dry cellulose ether film may be exposed to a solution of polyisocyanate ranging in concentration from about 1% to about 100% by weight. The processes may be carried out in the absence of an isocyanate catalyst, added heat or added pressure.

The present processes may further include treating a cellulose film with a suspension of a base in a suitable solvent and drying the resulting cellulose film to provide the substantially dry cellulose ether film comprising alkoxide groups on the cellulose. In some embodiments, the base is an alkali metal hydroxide. Suitable solvents for the present processes may be selected from, e.g., THF and acetone.

In some embodiments, the present processes include treating a methyl cellulose film with a suspension of alkali metal hydroxide in an organic solvent, drying the film to provide a substantially dry methyl cellulose film comprising alkali metal alkoxide groups on the cellulose, and exposing said film to a diisocyanate to provide a cross-linked cellulose ether film.

In another aspect, the present technology provides cross-linked cellulose ether films. In some embodiments, at least 99 mol % of cellulosic hydroxyl groups of the film are cross-linked as polyurethane groups. In other embodiments the films include methyl cellulose. The films may be produced by any of the processes described herein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
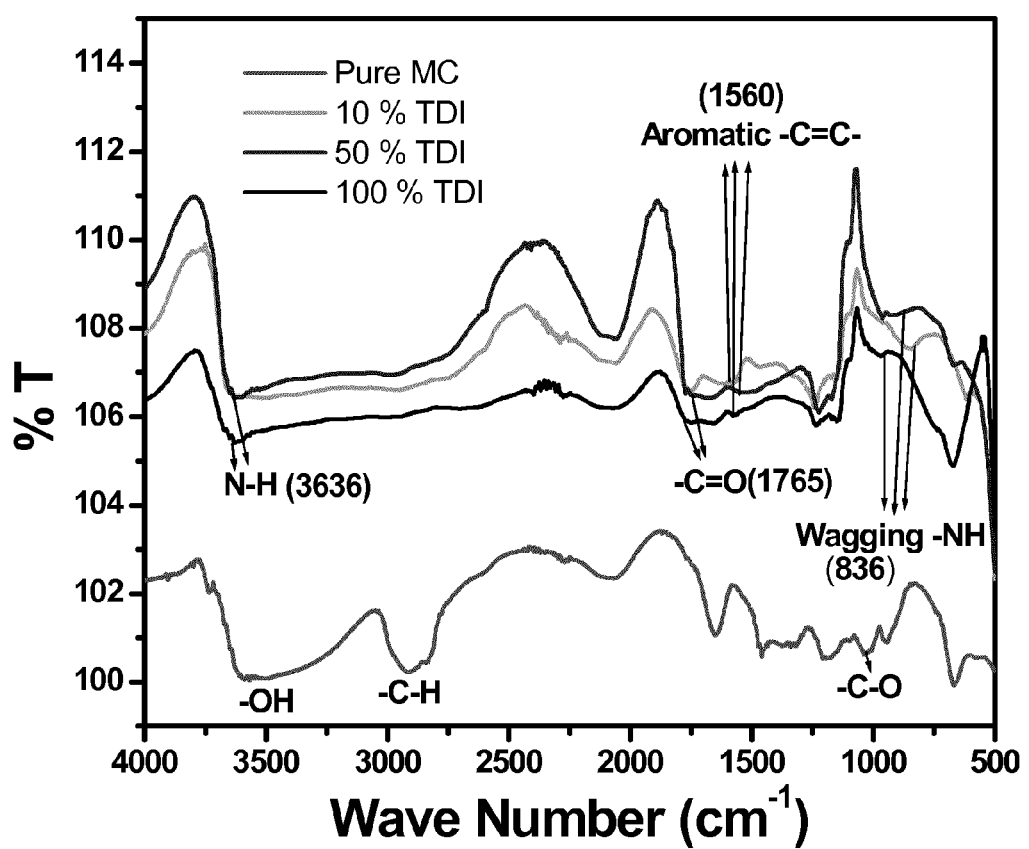
FIG. 1 depicts FTIR spectra of an illustrative embodiment of methyl cellulose films cross-linked by polyurethanes according methods of the present technology.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology provides processes for cross-linking cellulose films under mild conditions as well as the films produced by such processes. The processes avoid potentially toxic metal catalysts and harsh conditions. Instead, the processes may be carried out at room temperature using readily available and inexpensive reagents. Cellulose ether films produced according to the present processes are highly cross-linked by urethane linkages and therefore more stable to aqueous conditions than films lacking such extensive cross-links.

In one aspect, the present processes include exposing a substantially dry cellulose ether film to a polyisocyanate to provide a cross-linked cellulose ether film, wherein the substantially dry cellulose ether film includes alkoxide groups on the cellulose. Any cellulose ether having a Degree of Substitution (DS) of less than 3.0 is suitable for use in the present processes. By "cellulose ether" is meant a cellulose in which at least some of the glucose hydroxyl groups exist as ethers such as, but not limited to, alkyl ethers, hydroxyalkyl ethers, and carboxyalkyl ethers. The DS of any particular cellulose ether is defined as the average number of substituted hydroxyl groups (i.e., ether groups) per glucose, and the theoretical maximum is thus a DS of 3.0. Examples of cellulose ethers that may be used in the present processes include but are not limited to methyl cellulose, ethyl cellulose, 2-hydroxyethyl cellulose, 2-hydroxypropyl cellulose, 3-hydroxybutyl cellulose, carboxymethyl cellulose, carboxymethyl 2-hydroxyethyl cellulose, 2-hydroxyethyl methyl cellulose, 2-hydroxybutyl methyl cellulose, and 2-hydroxyethyl ethyl cellulose. In some embodiments, methyl cellulose or ethyl cellulose are used. In some embodiments, the cellulose ether has a DS of about 1 to about 2.5, and in others from about 1.3 to about 2.2, from about 1.5 to about 2.0 or from at least 1 to less than 2.5.

In some embodiments, the cellulose ether films employed in the present methods include alkoxide groups on the cellulose. In illustrative embodiments, the alkoxide groups may be alkali metal alkoxide groups in which the metals are selected from lithium, sodium, potassium, and cesium. Cellulose ether films having alkoxide groups may be prepared by treating a cellulose ether film with a suspension of a base in a suitable solvent. The base must be strong enough to abstract protons from the cellulose hydroxyl groups to create the alkoxide. Thus, for example, an alkali metal hydroxide may be suspended in an organic solvent to provide a cellulose ether film comprising alkoxide groups on the cellulose. Alkali metal hydroxides that can be used include but are not limited to sodium hydroxide and potassium hydroxide. Suitable solvents include any solvent that allows the formation of alkoxide groups on the cellulose ether film without adversely affecting the integrity of the film significantly. For example, a polar aprotic solvent such as THF or aceteone may be used in alkoxide formation.

To provide highly cross-linked films, all or nearly all of the cellulose hydroxyl groups must be deprotonated to form alkoxide groups. To achieve such levels of alkoxides, a molar excess of base versus the molar amount of hydroxyl groups may be used. Those of skill in the art may readily determine the amount of base necessary to provide complete or nearly complete conversion of cellulose hydroxyl groups to alkoxides. However, less base may be used if less cross-linking is desired, and it is within the skill in the art to select and prepare all such alkoxide-containing cellulose ethers. In one embodiment, a film of methyl cellulose is soaked in a suspension of 0.6 g NaOH per 100 mL of THF for up to 12 hours at room temperature and subsequently dried in vacuo afterwards. After formation of the alkoxides, the films may be rinsed with a suitable water-soluble aprotic solvent such as, but not limited to, acetone to remove excess alkali and dried, e.g., in vacuo, to provide a substantially dry cellulose ether film comprising alkoxide groups.

To provide the highly cross-linked cellulose ether films of the present technology, the cellulose ether films comprising alkoxides should be substantially dry before exposure to polyisocyanate. By "substantially dry" is meant completely or almost completely free of water. For example, after formation of the alkoxides and drying in vacuo, the cellulose ether film should contain less than 1% water by weight. Preferably the cellulose ether film contains less than 0.5 wt %, less than 0.2 wt %, or less than 0.1 wt % water. FTIR may be used to monitor how much water remains in the film. Too much water in the cellulose ether film can convert the alkoxide groups back to hydroxyls, and prevent their reaction with the polyisocyanate. Adventitious water may also react with the polyisocyanate, destroying the reagent itself.

Polyisocyanates, as employed in the present processes, have at least two isocyanate groups (—NCO). In some embodiments, the polyisocyanates have from two to four isocyanate groups. For example, the polyisocyanates may be selected from alkyl diisocyanates, aryl diisocyanates, and poly(diphenylmethane diisocyanate)s. Alkyl diisocyantes of the present technology include linear and branched $C_{1-14}$ alkanes bearing two —NCO groups. Illustrative embodiments of alkyl diisocyanates include but are not limited to 1,6-hexamethylene diisocyanate, isophorone diisocyanate and 4,4-methylene dicyclohexyl diisocyanate. Aryl diisocyanates of the present technology include one or two $C_{6-10}$ aryl groups (e.g., phenyl or naphthyl) which bear a total of two —NCO groups. Illustrative embodiments of aryl diisocyanates include toluene diisocyanate, xylene diisocyanate and diphenylmethane diisocyanate. In some embodiments, the diphenylmethane diisocyanate is 4,4'-diphenylmethane diisocyanate. Poly(diphenylmethane diisocyanate) having more than two isocyanate groups may also be used such as, e.g., PAPI 2940 from Dow Chemical. In some embodiments, the poly(diphenylmethane diisocyanate) has a weight average molecular weight ranging from about 500 Daltons to about 1600 Daltons, or from about 500 Daltons to about 800 Daltons or about 1000 Daltons.

In the present methods, the substantially dry cellulose ether film is cross-linked by exposure to a solution of polyisocyanate ranging in concentration from, e.g., about 1% to about 100% by weight. The amount of cross-linking may be controlled by the concentration of polyisocyanate and/or the length of time of the exposure. Higher concentrations of polyisocyanate generally lead to more cross-linking of the cellulose hydroxyl groups as polyurethanes. In some embodiments, the polyisocyanate is used neat (i.e., 100%). In other embodiments, the polyisocyanate is in a solution with a suitable organic solvent. Such a solvent must solubilize the cellulose ether sufficiently to allow impregnation of the cellulose ether film by the polyisocyanate and subsequent reaction to form the polyurethane linkages. However, the solvents should not react with the cellulose alkoxide groups or the polyisocyanate. Suitable solvents thus include, for example, polar aprotic solvents including, but are not limited to, THF, acetone and propylene carbonate. The concentration of polyisocyanate in solvent may range from about 1% to about 99%, about 10 wt % to about 80 wt %, about 20 wt % to about 70 wt %, about 30 wt % to about 60 wt %, or about 50 wt %. In contrast to typical processes for cross-linking cellulose ethers, the present processes can be carried out in the absence of an isocyanate catalyst, added heat or added pressure.

The present processes increase the weight of the cellulose ether films. In some embodiments, the desired weight addition to the cellulosic ether is in a range of from about 5 to about 50% depending upon the desired end properties in the cross-linked films. In other embodiments the weight addition to the cellulosic ether ranges from about 5 to about 25% or about 25% to about 50%. In manufacturing useful products that are relatively rigid, strong and water repellant, the polyisocyanate may range in weight from about 5% or about 8% to about 10% or about 20% or about 30% of the cross-linked film where excellent end use properties are obtained at a reasonable manufacturing cost. In some embodiments, the polyisocyanate may range in weight from about 10% to about 20% of the cross-linked film.

Exposing the cellulosic ether film to polyisocyanate can be done by simply storing the film for the desired period of time (e.g., 5 minutes to an hour or for 10 to 20 minutes) in the polyisocyanate solution or passing the film through the solution for a sufficient time to allow the film to become impregnated with the solution. After reaction of the polyisocyanate to cross-link the cellulose ether, the solvent is removed. For example, the film may be removed from the polyisocyanate solution, rinsed with solvent that does not contain polyisocyanate, and optionally dried under reduced pressure. It is an advantage of the present technology that no catalyst is required during the exposure step. However, small quantities of catalyst such as, but not limited to, zinc dust, up to a level of, e.g., 0.05% by weight of the polyisocyanate, are generally permissible without producing adverse effects.

The present methods may be used to produce thin (e.g., ranging from about 0.1 mm to about 2 mm thick), cross-linked cellulose ether films. Such films are distinguished by their excellent stability in water compared to cellulose ether films which lack such cross-links. While the present methods allow films to be produced with nearly any range of cross-linking from, e.g., 1 mole percent (mol %) to 100 mol %, the methods are especially useful in the production of highly cross-linked films. In some embodiments of the present technology, at least 90 mol % of the cellulosic hydroxyl groups of the film are cross-linked as polyurethane groups. In other embodiments, at least 92 mol %, at least 95 mol %, at least 96 mol %, at least 97 mol %, at least 98 mol %, at least 99 mol %, or even 100 mol % of the cellulosic hydroxyl groups are cross-linked as polyurethane groups. Moreover, no detectable amounts of unreacted polyisocyanate remain in the film/membrane. In some embodiments the films include methyl cellulose.

EXAMPLES

The present technology is further illustrated by the following examples, which should not be construed as limiting in any way.

Example 1

Preparation of Cross-Linked Cellulose Ether Films

Methyl cellulose film (prepared according to the procedure of Bochek, A. M. et al. *Russian Journal of Applied Chemistry* 2001, 74, 1358-1363) was stored in a NaOH/THF suspension (prepared from 0.3 g NaOH/50 ml THF mixed for 24 h prior to use) for 12 hrs. Subsequently, the film was removed from the NaOH/THF suspension and washed several times with acetone to remove the water and alkali. The film was then vacuum dried at room temperature. The dried film was then dipped into a solution of toluene diisocyanate in THF (1, 10, 50 or 100 wt % TDI) for 20 min at about 25° C. and 1 atm. After the completion of the reaction, the cross-linked MC film was washed with dimethylformamide and acetone and then dried.

Example 2

FTIR Analyses

FTIR analyses were performed on a Perkin-Elmer RX-I spectrophotometer. Peaks were recorded in transmittance mode. A total of 32 scans at 4 cm$^{-1}$ resolution are collected to provide average spectra.

FIG. 1 shows the FTIR spectra of pure and cross-linked methyl cellulose (MC) films. The spectra of the pure methyl cellulose film differs from the cross-linked films by peaks at 3548, 2910, 1034 cm$^1$, indicating the presence of functional groups —OH, —CH$_3$, and —C—O—, respectively. By contrast, the pure MC film lacks the broad peak at 3636 cm$^{-1}$ that was present in all cross-linked films and indicates the presence of a secondary amine —N—H linkage. However, the cross-linked samples lack the peak observed at 2910 cm$^{-1}$ in pure MC due to the broad —N—H peak, which overlaps the 2910 cm$^{-1}$ peak. In all cross-linked samples, the intense peak at 1765 cm$^{-1}$ confirms the presence of the urethane —C=O group. Likewise, the peak at 1560 cm$^{-1}$ confirms the presence of aromatic ring of cross-linker (toluene diisocyanate). The absorption at 1640 cm$^{-1}$ is commonly assigned to absorbed water in pure MC films [1] (Colom, Carrasco, Pages, & Cañavate, 2003). The wagging of secondary amine (—NH) is observed near 836 cm$^{-1}$. Because no peak was observed near 2200 cm$^{-1}$, there does not appear to be any free —NCO groups present in the cross-linked MC samples. Thus, the cross-linking of MC with the present procedures leads to a non-toxic cross-linked MC.

Example 3

Differential Scanning Calorimetric (DSC) Analyses

The DSC analyses were performed on the cross-linked and virgin MC film samples according to the following procedure. The samples analyzed using Mettler Toledo DSC1 with a FRS5 Sensor instrument. The parameters for the analyses were the following.
Rate of heating: 10° C./min
Rate of cooling: −10° C./min
Heating range: 2 to 300° C.
N$_2$ flow: 40 mL/min Each sample (e.g. 6.72 mg) was initially heated from 25° C. to 300° C. so that moisture present in the sample was removed. The sample was cooled to room temperature. Finally, the cooled sample was again heated to 300° C. and the T$_g$ transition was recorded as the midpoint t$_g$ according to ASTM, IEC.

Figure 2:
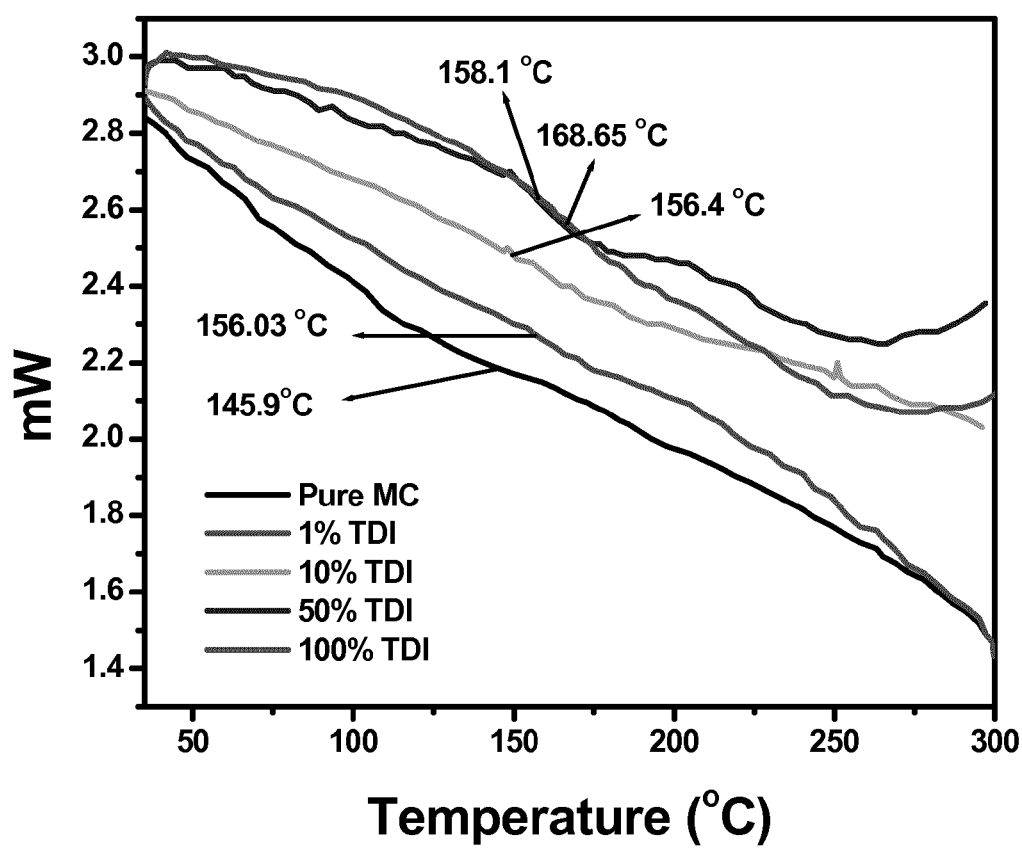
FIG. 2 depicts graphs of differential scanning calorimetric analyses of an illustrative embodiment of methyl cellulose films cross-linked by polyurethanes according methods of the present technology.

The data obtained is plotted in FIG. 2. It is observed from FIG. 2, that the mid point glass transition temperature (T$_g$) increases with an increase in the percentage of TDI (Table 1). This result is consistent with increasing cross-linking of the MC films.

TABLE 1

| Sample | TDI in THF (wt %) | T$_g$ (Midpoint) |
|---|---|---|
| 1 | 0 (Pure MC) | 145.9 |
| 2 | 1 | 156.30 |
| 3 | 10 | 156.40 |
| 4 | 50 | 158.02 |
| 5 | 100 | 168.65 |

Example 4

Stability Study

Figure 3:
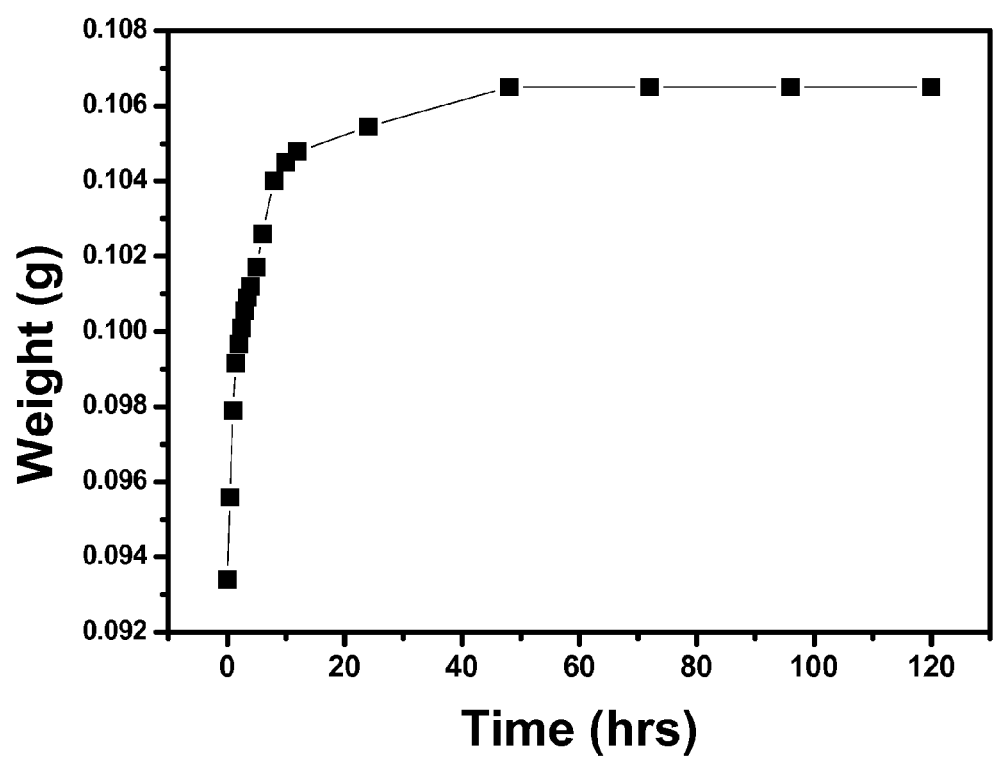
FIG. 3 depicts a graph of the absorption in water over time by an illustrative embodiment of a cross-linked methyl cellulose film of the present technology.

The cross-linked MC sample No. 4 from Example 3 (prepared using a 50% TDI solution) was immersed in 100 ml of distilled water and allowed to soak at room temperature for 5 days. The thickness of the samples was measured by means of a screw gauge. The dry samples were weighed on an electronic balance (Citizen, CX 220) and then stored in the water in bottles sealed by screw caps. The samples were taken out of the water at specific intervals and the excess water rubbed off. The samples were then weighed and again immersed in the water till equilibrium was attained [i.e. about 48 hrs]. The results in FIG. 3 show that the MC film is stable for more than 5 days, indicating its highly cross-linked structure. However, the uncross-linked virgin MC films were not stable more than 6 hrs and solubilized in water. Water absorbency (WA) of dried cross-linked MC films was calculated using equation 1 (Li Chen, Zhigang Xie, Xiuli Zhuang, Xuesi Chen, Xiabin Jing. (2008) *Carbohydrate Polymers* 72 2, 342-348):

$$WA = \frac{M}{M_0} - 1 \qquad (1)$$

M and $M_0$ refer to the weights of the water-swollen and dry films, respectively.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 carbon atoms refers to groups having 1, 2, or 3 carbons. Similarly, a group having 1-5 carbon atoms refers to groups having 1, 2, 3, 4, or 5 carbons, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process comprising exposing a substantially dry cellulose ether film to a polyisocyanate in a suspension of a base in a suitable organic solvent and drying the resulting cellulose ether film to provide a cross-linked cellulose ether film,
    wherein the substantially dry cellulose ether film comprises alkoxide groups on the cellulose and no more than about 0.1% water by weight.

2. The process of claim 1 wherein the cellulose ether is selected from the group consisting of methyl cellulose, ethyl cellulose, 2-hydroxyethyl cellulose, 2-hydroxypropyl cellulose, 3-hydroxybutyl cellulose, carboxymethyl cellulose, carboxymethyl 2-hydroxyethyl cellulose, 2-hydroxyethyl methyl cellulose, 2-hydroxybutyl methyl cellulose, and 2-hydroxyethyl ethyl cellulose.

3. The process of claim 1 wherein the alkoxide groups on the cellulose are alkali metal alkoxide groups.

4. The process of claim 3 wherein the alkali metal is selected from the group consisting of lithium, sodium, potassium, and cesium.

5. The process of claim 1 wherein the polyisocyanate is an alkyl diisocyanate, an aryl diisocyanate, or a poly(diphenylmethane diisocyanate).

6. The process of claim 5 wherein the polyisocyanate is selected from the group consisting of 1,6-hexamethylene diisocyanate, toluene diisocyanate, and diphenylmethane diisocyanate.

7. The process of claim 1 wherein the base is an alkali metal hydroxide.

8. The process of claim 1 wherein the suitable organic solvent is selected from the group consisting of THF and acetone.

9. The process of claim 1 wherein the substantially dry cellulose ether film is exposed to a solution of polyisocyanate ranging in concentration from about 1% to about 100% by weight.

10. The process of claim 1 carried out in the absence of an isocyanate catalyst, added heat or added pressure.

11. The process of claim 1 carried out at ambient temperature.

12. A process comprising treating a methyl cellulose film with a suspension of alkali metal hydroxide in an organic solvent, drying the film to provide a substantially dry methyl cellulose film comprising alkali metal alkoxide groups on the cellulose and no more than about 0.1% water by weight, and exposing said film to a diisocyanate in a suitable organic solvent to provide a cross-linked cellulose ether film.

* * * * *